United States Patent
Madsen et al.

(10) Patent No.: US 6,181,284 B1
(45) Date of Patent: Jan. 30, 2001

(54) ANTENNA FOR PORTABLE COMPUTERS

(75) Inventors: Brent D. Madsen, Providence; Jeffrey L. Jones, Orem; Dirk Ostermiller, Salt Lake City; Sy Prestwitch, West Jordan; Ryan Kunz, Roy, all of UT (US)

(73) Assignee: 3 Com Corporation, Santa Clara, CA (US)

( * ) Notice: Under 35 U.S.C. 154(b), the term of this patent shall be extended for 0 days.

(21) Appl. No.: 09/322,870

(22) Filed: May 28, 1999

(51) Int. Cl.$^7$ ...................................................... H01Q 1/24
(52) U.S. Cl. ........................... 343/702; 343/721; 455/557
(58) Field of Search .................................. 343/702, 900, 343/901, 721; 455/557; H01Q 1/24

(56) References Cited

U.S. PATENT DOCUMENTS

| | | | |
|---|---|---|---|
| 5,557,288 | * 9/1996 | Kato et al. | 343/702 |
| 5,567,537 | 10/1996 | Yoshizawa | 428/692 |
| 5,606,594 | 2/1997 | Register et al. | 379/58 |
| 5,646,635 | 7/1997 | Cockson et al. | 343/702 |
| 5,655,143 | 8/1997 | Alpert et al. | 361/600 |
| 5,684,672 | 11/1997 | Karidis et al. | 361/683 |
| 5,739,791 | 4/1998 | Barefield et al. | 343/702 |
| 5,821,907 | 10/1998 | Zhu et al. | 343/906 |
| 5,828,341 | 10/1998 | Delamater | 343/702 |
| 5,828,346 | 10/1998 | Park | 343/826 |
| 5,867,131 | 2/1999 | Camp, Jr. et al. | 343/797 |
| 5,896,574 | 4/1999 | Bass, Sr. | 455/557 |
| 5,909,194 | * 6/1999 | Umeda et al. | 343/702 |
| 5,917,453 | * 6/1999 | Uchino et al. | 343/721 |
| 5,918,163 | * 6/1999 | Rossi | 343/702 |
| 5,949,379 | * 9/1999 | Yang | 343/702 |
| 6,049,310 | * 4/2000 | Sadahiro | 343/702 |

OTHER PUBLICATIONS

Bluetooth–Document Page, "Overview," www. bluetooth-.com/document/default.asp?page=overview, pp. 1–2 (date unknown).

Bluetooth–Document Page, "Radio," www. bluetooth.com/document/default.asp?page=radio, p. 1 (date unknown).

Bluetooth–Document Page, "Baseband," www. bluetooth-.com/document/default.asp.?page=baseband, pp. 1–3 (date unknown).

Bluetooth–Document Page, "Link Management," www. bluetooth.com/document/default.asp?page=1m, p. 1 (date unknown).

Bluetooth–Document Page, "Software Framework," www. bluetooth.com/document/default.asp?page=swfw, p. 1 (date unknown).

Bluetooth–Document Page, "PC General," www. bluetooth-.com/document/default.asp?page=pc, p. 1 (date unknown).

Bluetooth–Document Page, "Telephone," www. bluetooth-.com/document/default.asp?page=phone, p. 1 (date unknown).

Bluetooth–FAQ "General," www.bluetooth.com/faq/default.asp. p. 1–2 (date unknown).

Andrew Till, "Bluetooth Expands Wireless Data Appeal," Computer Dealer News, vol 15, No. 6, pp. 1–2 (Feb. 12, 1999).

* cited by examiner

*Primary Examiner*—Hoanganh Le
(74) *Attorney, Agent, or Firm*—Workman, Nydegger & Seeley

(57) ABSTRACT

An antenna system for a portable computer allows communication between a portable computer and a wireless communication system to be established. The antenna is placed in a use position when the computer is opened to facilitate wireless communication and the antenna is placed in a storage position when the computer is closed. In the storage position, the antenna is placed in a storage compartment in the base unit of the computer. Additionally, the antenna has a first position in which the antenna is generally linearly aligned and a second position in which the antenna is positioned at approximately a 90° angle.

34 Claims, 8 Drawing Sheets

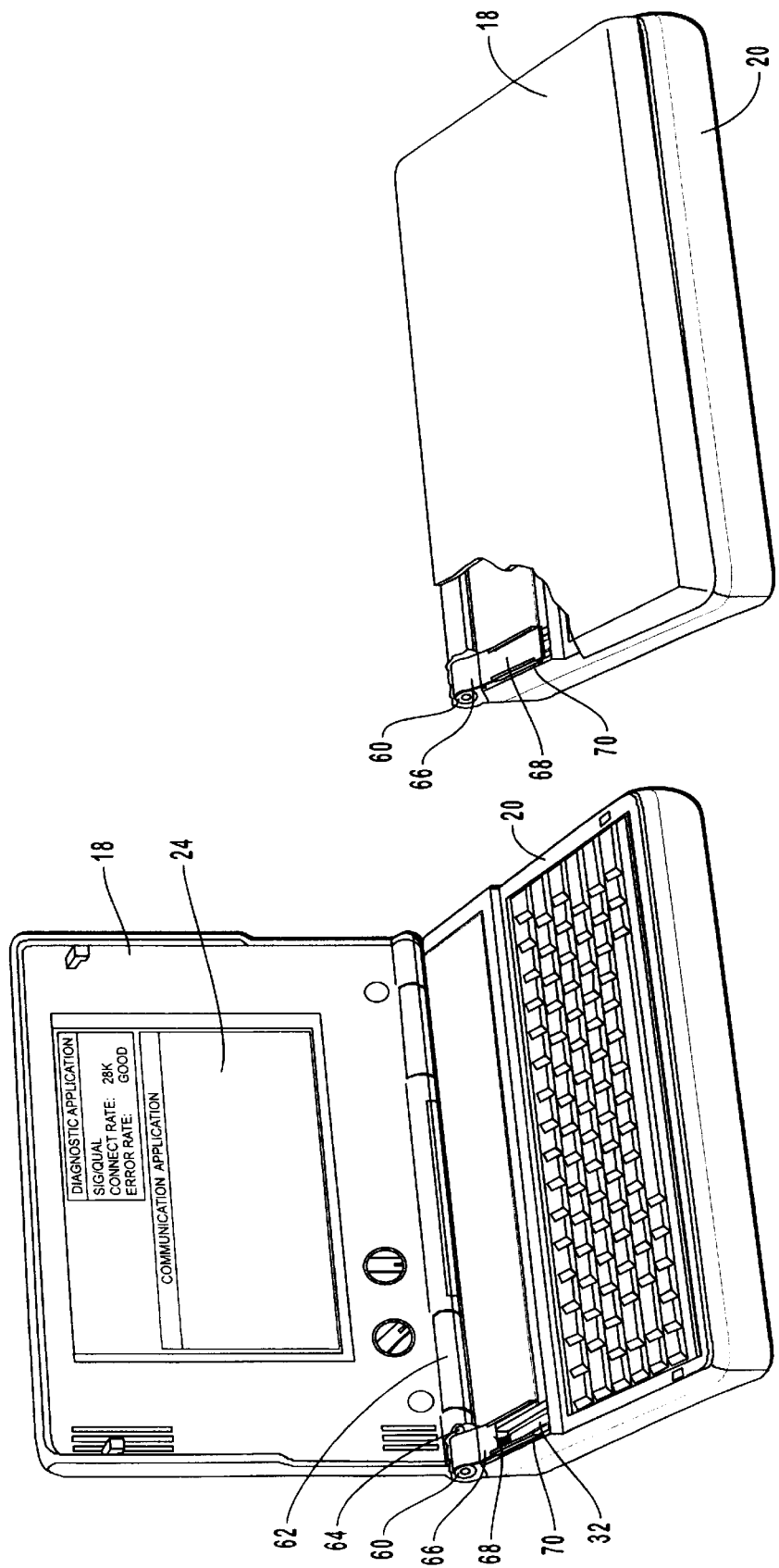

ANTENNA FOR PORTABLE COMPUTERS

BACKGROUND OF THE INVENTION

1. Field of the Invention

The present invention generally relates to portable computers and, in particular, to antennas for portable computers.

2. Description of Related Art

Various communication systems are used to allow computers to communicate and exchange data and other types of information. For example, computers are often linked by various networks, including Local Area Networks (LAN), Internet, Ethernet and conventional telephone networks. These known communication systems, however, usually require the computer to be physically connected to telephone lines, modems or specialized wiring. In some locations, however, it is difficult if not impossible to be physically connected to the communication system. Additionally, these known systems generally cannot be used if the user is traveling or moving to different locations.

It is also known to use cellular telephone and wireless systems to connect computers to a communication system. Cellular telephone systems are particularly effective in allowing computers to communicate because the computer does not have to be connected to an existing telephone line. In addition, cellular telephone systems are very useful in connection with portable computers because the cellular communication circuitry can be miniaturized and provided as a component of the computer.

Antennas used with cellular communication systems generally include a number of antenna elements, each including a radiating element which is equal in length to some fraction of the wavelength desired to be transmitted or received. In order to increase the efficiency of communication, these known antennas must include elements which are separated by a minimum distance and these elements are preferably orientated normal to each other to provide the necessary separation and spatial diversity.

Conventional antennas used to connect a computer to a wireless communication system or cellular telephone are typically placed externally of the computer because of the noise, interference, obstruction and shielding caused by the various components of the computer. In particular, conventional antennas do not function correctly if they are obstructed or shielded by the housing or other structures of the computer.

Conventional antennas are also generally rigid and they protrude a relatively long distance from the body of the computer. These protruding antennas are often large, unwieldy, aesthetically unpleasing and they make the computer difficult to move and transport. In addition, these antennas are often bent, broken, knocked out of alignment or otherwise damaged because they can easily catch or strike foreign objects such as people, walls, doors, etc. Further, these known antennas require a large support structure to secure the antenna to the housing of the computer and this support structure requires a considerable amount of space inside the body of the computer. This space is very valuable, especially in small, portable computers. Additionally, the support structure is often damaged when the antenna is accidentally moved.

It is known that the repair and replacement of conventional antennas and the associated support structure is difficult and costly. In fact, the entire antenna assembly is often removed and replaced instead of attempting to repair a portion of the antenna or support structure. Thus, the repair and replacement of the antenna and/or antenna support structure is expensive and time consuming.

In order to alleviate these problems, known antennas are often removed before the computer is moved or transported. Additionally, known antennas must often be removed before the computer can be inserted into its carrying case. Disadvantageously, this requires additional time and resources to remove and reattach the antenna each time the computer is moved. Additionally, the antenna is often misplaced, lost or damaged when it is detached from the computer. Further, because the user often does not want to take the time and effort to remove the antenna, the computer is moved with the antenna still attached to the computer and this frequently results in the antenna being damaged or broken.

It is known to use a telescoping antenna in an attempt to minimize these problems. For example, U.S. Pat. No. 5,684, 672 issued to Karidis, et al. discloses a laptop computer with an integrated multi-mode antenna. The telescoping antenna is integrated into the cover or display portion of the laptop and it outwardly extends from the display portion for use. The telescoping antenna is then retracted into the display portion when it is not in use. A coaxial cable connects the antenna to the base of the computer. In particular, the coaxial cable connects the antenna to a radio frequency (RF) adaptor card inserted into a Personal Computer Memory Card International Adapter (PCMCIA) slot in the base of the computer. Disadvantageously, the coaxial cable or connector disclosed in the Karidis patent protrudes outwardly from the base of the computer and the user must manually extend and retract the antenna. Additionally, it is well known that an antenna should be placed in a vertical position to obtain the optimum signal strength. However, because the antenna disclosed in the Karidis patent is attached to the display portion of the computer and the antenna is positioned parallel to the display screen, the display screen must be vertically positioned in order for the antenna to obtain the best possible signal. The vertical positioning of the screen, however, may not be the preferred viewing angle of the screen for the computer user. Further, this and other conventional antennas have limited connectivity when the display screen is in the closed position because the antenna extends in a horizontal plane and the housing of the computer may obstruct or shield the antenna.

It is also known to connect an antenna directly to a PCMCIA card. When this type of card is inserted into the PCMCIA slot in the body of the computer, the antenna extends outwardly from the body of the computer. The PCMCIA card and the computer itself, however, are easily damaged by accidental contact with the outwardly extending antenna. Thus, users of PCMCIA cards with antennas must be extremely careful when using the computer in order to avoid damage to the card and/or computer. Additionally, these PCMCIA cards with antennas generally must be removed from the PCMCIA slot in the computer whenever it is desired to store or move the computer. This requires additional time and effort by the user, and the PCMCIA card and antenna may be lost, damaged or misplaced by the user when it is not connected to the computer.

In addition, the PCMCIA card with the attached antenna often receives a degraded or impaired signal because the antenna is frequently obstructed by the computer housing and/or shadowed by the ground plane of the display. Further, the antennas of these types of PCMCIA cards typically have a ferrite core which is very brittle and it is easily broken. If the ferrite core is broken, PCMCIA card assembly or the antenna must be repaired or replaced.

SUMMARY OF THE INVENTION

A need therefore exists for an antenna for a portable electronic device such as a computer which eliminates the above-described disadvantages and problems.

One aspect of the present invention is an antenna system for a portable computer. The antenna system advantageously provides wireless or radio frequency (RF) communication with other networks or communication systems to allow data and other information to be shared or exchanged. The antenna system includes an antenna attached to the base of the computer and, when wireless communication is desired, the antenna protrudes from the base in a generally vertical direction. When wireless communication is not desired, the antenna is stored in a recess or storage compartment in the computer base. This storage position protects the antenna from damage. Advantageously, the antenna can be quickly and easily positioned in the desired vertical direction for use and it can be simply and promptly placed in the storage position when wireless communication is not desired.

In another aspect of the antenna system, the antenna is automatically moved from the storage position and into the use position when the computer is opened. Additionally, the antenna is automatically moved from the use position and into the storage position when the computer is closed. That is, the antenna is automatically deployed into the use position when the computer is opened and it is stowed in the storage position when the computer is closed. Desirably, this process occurs without any intervention by the user other than to open or close the computer.

Yet another aspect of the antenna system is the antenna is automatically moved between the storage and the use positions without the antenna contacting the housing of the computer. Significantly, this prevents the antenna and housing from rubbing or frictional contact, and this reduces or eliminates potential damage to the antenna and the housing. This advantageously prolongs the life of the antenna system and/or the computer housing.

Still another aspect of the antenna system is a mechanism for securing the antenna in the storage position when it is not in use and deploying the antenna when the computer is in use. For example, the mechanism may include a sliding member and a cam system to move the antenna between the storage position and the use position. In greater detail, the cover or display portion of the computer and base of the computer are interconnected by hinge members and each time the display portion or base is rotated about the hinge members, that causes the cam to rotate. The rotating cam moves the sliding member along a track and that causes the antenna to move either into the use or storage position.

Another aspect of the antenna system is the antenna can be manually moved by the user of the computer. Advantageously, this allows the user to determine the positioning of the antenna. The antenna system also includes a latch which maintains the antenna in the stored position. The latch, however, is readily releasable to allow the antenna to be moved.

Yet another aspect of the antenna system is the antenna can be removed from the recess in the computer housing while the computer is closed. In particular, the housing includes an opening or access portion which allows the antenna to be moved out of the recess in the base of the computer when the computer is closed. Advantageously, this allows the computer to be connected to a wireless communication system without opening the computer. For example, the computer can now be coupled to a docking system while the computer is closed.

In a preferred embodiment of the present invention, the apparatus allows wireless communication between a portable computer and a communications network to be established. The apparatus includes a portable computer with a base unit having an upper surface, a lower surface and side walls. The portable computer also includes a display unit which is attached to the base unit and the computer is movable into an open position and a closed position. An antenna is attached to the base unit of the portable computer and a storage compartment is located in the base unit. The storage compartment is sized and configured to receive at least a portion of the antenna when the computer is in the closed position.

The apparatus also includes an input device connected to the base unit and the antenna is attached to the base unit proximate the input device. Desirably, the antenna is configured to automatically extend outwardly from the base unit and into a use position when the computer is in an open position to facilitate wireless communication between the computer and the communications network. Additionally, the antenna is configured to be automatically placed in the storage position when the computer is in the closed position. For example, a sliding member may place the antenna in the storage position when the computer is in the closed position. Alternatively, an engagement surface on the display unit may engage the antenna when the computer is being closed to place the antenna in the storage position. In addition, the apparatus may include a latch mechanism which retains the antenna in the storage position. Further, the apparatus may include an opening in a side wall of the base unit to allow the antenna to be removed from the storage compartment without the computer being opened.

In another preferred embodiment, the present invention includes a portable computer having an open position and a closed position. The portable computer includes a base unit with an upper surface, a lower surface and at least two side walls; an antenna is connected to the base unit and configured to establish wireless communication between the portable computer and a wireless communication system; and a recess is sized and configured to receive at least a portion of the antenna when the computer is in the closed position. The antenna is automatically stored in the recess when the computer is in the closed position and the antenna automatically extends from the base unit when the computer is in the open position.

The present invention, in yet another preferred embodiment, includes a portable computer having an open position and a closed position. Attached to the computer is a flexible antenna having a first position wherein the antenna is generally linearly aligned and a second position wherein the antenna is positioned at approximately a 90° angle. The computer includes a base unit with a recess adapted to receive at least a portion of the flexible antenna when the antenna is in a storage position. The antenna can also extend generally perpendicular to an upper surface of the base unit in a use position. Preferably, the antenna is automatically placed in the storage position when the computer is closed and the antenna is automatically placed in the use position when the computer is opened. More preferably, the antenna is in the first, generally linearly aligned position when it is stored in the storage position and the antenna is in the second, angled position when it is in the use position. Alternatively, the antenna can be in the second position when it is in the storage position and it can be in the first position when it is in the use position.

Another preferred embodiment of the present invention is an antenna for use with a portable computer having a base unit with a recess sized and configured to receive the antenna. The antenna includes a flexible, elongated radiating element having a first end and a second end; a flexible sheath substantially covering said elongated radiating element, the sheath configured to permit the radiating element to bend; and a fastener connected to a first end of the elongated radiating element and configured to attach the antenna to a portable computer. The antenna is configured to be positioned within the recess in the base unit when the antenna is in a storage position and the antenna is configured to extend outwardly when the antenna is in a use position.

Desirably, an indicator is attached to the end of the elongated radiating element. The indicator is preferably a light source that indicates use of the antenna or portable computer, or signal strength. The radiating element of the antenna may include a plurality of elongated members positioned proximate to each other. These elongated members are separated by a dielectric material, but the members are spaced close enough to create a monopole or dipole antenna. One of said elongated members provides a signal or power source to an indicator and another of said elongated members provides a ground source.

Advantageously, the antenna system of the present invention is small, compact antenna that protrudes a minimum distance from the housing of the computer. Additionally, because the antenna and its associated components are very small and compact, it has minimum size and space requirements. Accordingly, the antenna system has little effect on existing portable computer designs and it requires only a small space inside the computer housing. This significantly decreases design and manufacturing costs.

These and other aspects, features and advantages of the present invention will become more fully apparent from the following detailed description and appended claims, or may be learned by the practice of the invention as set forth hereinafter.

BRIEF DESCRIPTION OF THE DRAWINGS

The appended drawings contain figures of preferred embodiments of the present antenna system for a portable computer. The above-mentioned aspects, features and advantages of the antenna system, as well as other features, will be described in connection with the preferred embodiments. Understanding that these preferred embodiments are only intended to illustrate the invention and not limit its scope, the invention will be described and explained with additional specificity and detail through the use of the accompanying drawings in which:

FIG. 6 is a perspective view of an antenna system for a portable computer in accordance with another preferred embodiment of the present invention, illustrating the antenna protruding from the base of the antenna;

FIG. 7 is a perspective view of the antenna system shown in FIG. 6, illustrating the antenna substantially positioned within the storage compartment;

DETAILED DESCRIPTION OF THE PREFERRED EMBODIMENTS

The present invention involves an antenna system for an electronic device such as a computer. The computer is preferably a portable computer but it will be understood that the computer may be any suitable type of general or special purpose computer. The principles of the present invention, however, are not limited to computers. It will be understood that, in light of the present disclosure, the antenna system disclosed herein can be successfully used in connection with other types of electronic devices such as cellular telephones, digital communication systems, personal data assistants (PDA) and the like.

Additionally, to assist in the description of the antenna system, words such as top, bottom, front, rear, right, left, vertical and horizontal are used to describe the accompanying figures. It will be appreciated, however, that the antenna system of the present invention can be located in a variety of desired positions—including various angles, sideways and even upside down. A detailed description of the antenna system now follows.

Figure 1:
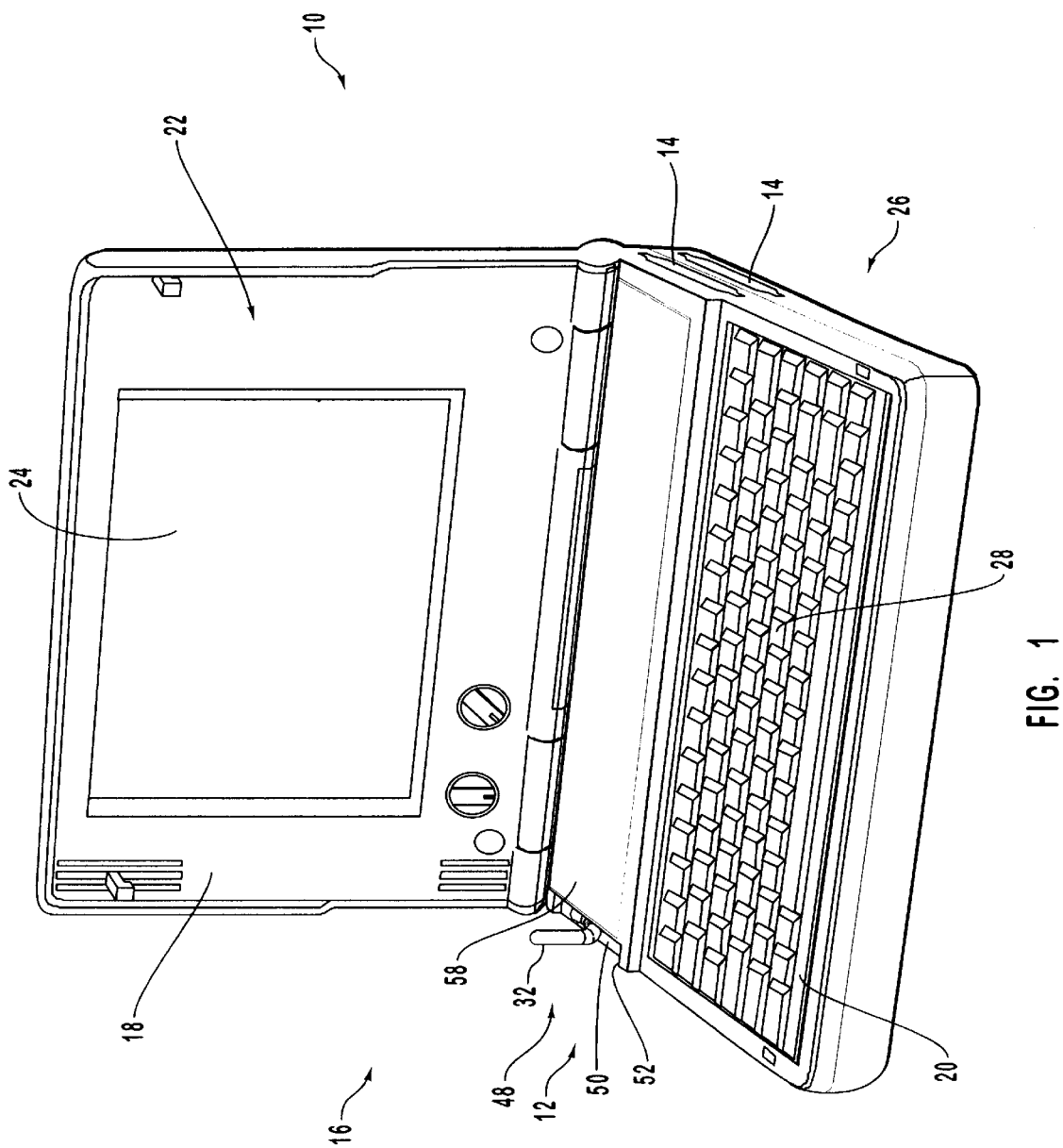
FIG. 1 is a perspective view of an antenna system for a portable computer in accordance with a preferred embodiment of the present invention, illustrating the antenna protruding from the base of the computer.

FIG. 1 illustrates a portable computer 10 with an antenna system 12 used in accordance with a preferred embodiment of the present invention. The term portable computer 10 is used broadly to describe any suitable computer such as a personal computer, laptop computer, notebook computer, hand-held computer, palmtop computer or other type of computer with the desired characteristics. The antenna system 12 can also be used with other electronic devices such as cellular telephones, digital communication systems, personal data assistants and the like.

The portable computer 10 includes one or more slots 14 (two exemplary slots are shown in FIG. 1) for accepting cards that substantially comply with applicable Personal Computer Memory Card International Association (PCMCIA) standards, but these slots are not required. The PCMCIA standards, for example, are described in detail in the PCMCIA Specification Standard Release 2.1, which is hereby incorporated by reference. The PCMCIA specification, for example, provide standards for data storage and peripheral expansion cards. Additionally, the PCMCIA specification provides standards for input/output (I/O) capability for a standard bus extension slot so that peripherals such as modems and LAN adapters can use the bus. It will be understood, however, that while the portable computer 10 is described with respect to PCMCIA standards, the computer 10 and antenna system 12 may be used with virtually any type of circuit cards and adaptor cards. Additionally, while these cards are preferably a miniature type, any suitable size and type of card may be used.

The computer 10 includes a body or housing 16 which includes a covering or upper portion 18 and a base or lower portion 20. Located within the base 20 are various known computer circuitry components such as processing units, printed circuit boards and memory storage devices. One skilled in the art will understand that the computer 10 may include various components depending, for example, upon the type and configuration of the computer.

An adaptor which provides an interface between the computer 10 and the antenna system 12 is also located within the base 20. The adaptor, for example, may include a printed circuit board and may provide processing such as RF signal processing and/or baseband processing. The adaptor may also include a power source such as a battery or other device to provide power to the antenna system 12, but it will be understood that the antenna system may receive power from any desired source such as the computer 10 or an external power source.

The antenna system 12 is configured to be in communication with a wireless communications network. The wireless communications network, for example, may include wireless modems, wireless LAN, wireless Personal Area Network (PAN), cellular telephone networks, digital communication systems, etc. The wireless communication network may also include Bluetooth technology. Bluetooth technology is a low-powered radio system which allows products containing Bluetooth technology to be interconnected via wireless communication.

As shown in FIG. 1, the upper portion 18 of the portable computer 10 includes a display 22 which preferably comprises a display screen 24 such as a liquid crystal display (LCD), gas plasma display or other type of suitable display. The base 20 of the computer 10 includes an input device 26 such as a keyboard 28, but other input devices such as touch screens, pointing devices, numeric pads, etc. may also be used. As known to those skilled in the art, the computer 10 may also include a variety of other components such as disk drives, memory devices, etc. Further, the computer 10 may be connected to peripheral devices such as modems, printers and the like.

The cover 18 and the base 20 of the portable computer 10 are pivotally connected by one or more hinges. The hinges allow the cover 18 to be rotated with respect to the base 20 and that allows the computer to be placed in an open position such that access to the keyboard 28 and display screen 24 is provided to the user of the computer. Alternatively, the cover 18 and base 20 can be placed in a closed position to protect the computer 10 from damage and to facilitate transportation of the computer.

Attached to the base 20 of the computer 10 is an antenna 32. The antenna 32 is preferably located along a side of the computer housing 16 and more preferably the antenna is located along an edge of computer housing proximate the keyboard 28. Most preferably, the antenna 32 is positioned proximate the left side of the keyboard 28 so that it does not interfere with the use or operation of the keyboard. It will be appreciated, however, that the antenna 32 may be positioned on the right side of the keyboard 30 or in any desired location depending, for example, upon the configuration of the computer housing, available space, location of other components, desired radiation characteristics and the like. It will also be appreciated that the antenna 32 is preferably positioned such that it maintains maximum performance and it minimizes ground plane and shielding effects of the computer 10.

The antenna 32 of the antenna system 10 is a monopole antenna, but any suitable type of antenna, such as dipole or slotted antenna, may also be used depending upon factors such as desired polarization and radiation patterns, or type of wireless communication system. Additionally, while the antenna system 12 may be used with any suitable wireless communication system, the antenna system is preferably configured to conform with applicable Bluetooth technology specifications and standards. Bluetooth technology allows the computer 10 to be connected to a wide range of computing and telecommunication devices via wireless connections. Specifications and other information regarding Bluetooth technology are available at the Bluetooth Internet site www.bluetooth.com. Additionally, specifications and other information regarding Bluetooth technology will be published in the Bluetooth Special Interest Group (SIG) Version 1.0.

In accordance with the proposed Bluetooth specifications, the antenna 32 is configured to use the Industrial Scientific and Medical (ISM) frequency band of 2.4 to 2.4835 gigahertz (GHz). One skilled in the art, however, will appreciate that the antenna 32 can be used with any suitable band or frequency depending, for example, upon the intended use of the antenna system 12.

Figure 2:
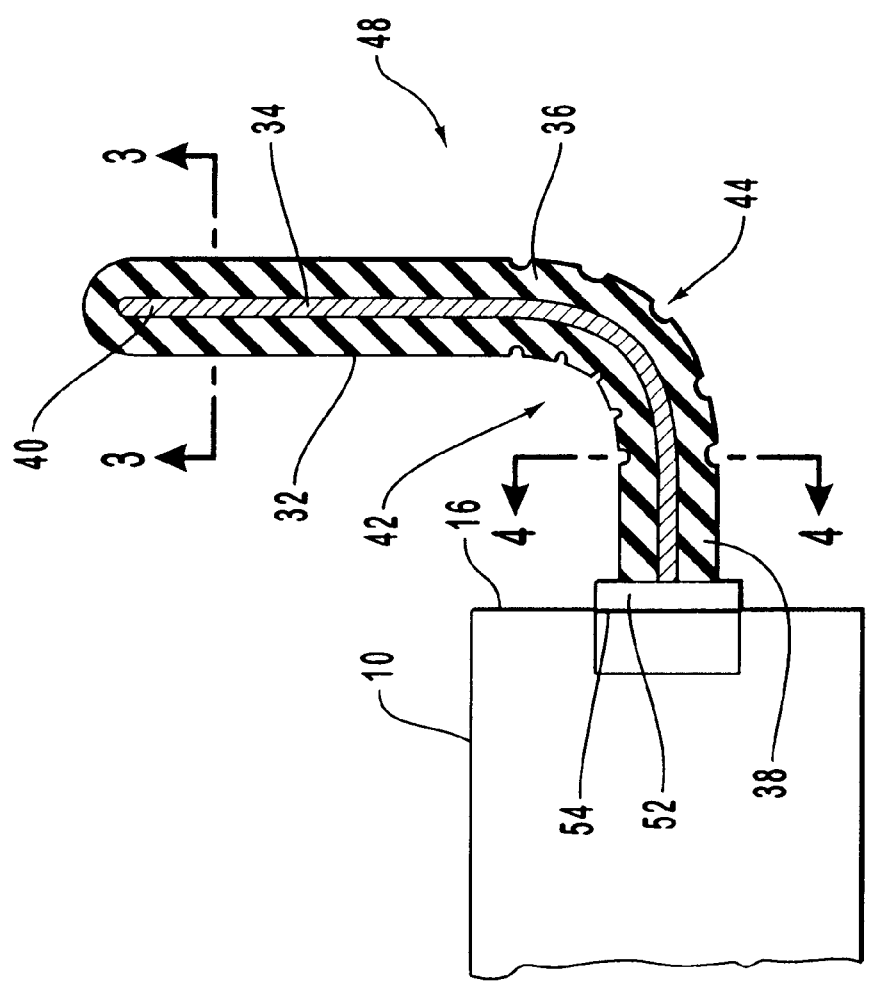
FIG. 2 is an enlarged perspective view of the antenna system shown in FIG. 1, illustrating the antenna and the portable computer is partially cut away.

As best seen in FIG. 2, the antenna 32 includes a radiating element 34 which is constructed of a flexible, metallic material that permits repeated bending or flexing of the antenna. In particular, the material has a modules of elasticity which allows the radiating element 34 to be readily bent or flexed into the desired position. The radiating element 34 also has an elastic limit and fatigue limit which allows the radiating element to be repeatedly moved and positioned in the desired manner. The radiating element 34 is preferably constructed of spring steel having the desired characteristics, but it may be constructed from other suitable materials such as copper or bronze.

The radiating element 34 is preferably plated with a conductive material such as copper and the plating desirably has a thickness of at least about 0.0003 inches, but the plating may be thicker or thinner and other suitable conductive material may be used. Additionally, the radiating element is preferably passivated, but this is not required. It will be understood that the radiating element 34 may be constructed from various metallic conductors attached to a flexible substrate such as copper conducting trace on a flexible polyamide substrate. The substrate, for example, may be constructed of Kapton® (a flexible polyimide film available from the E.I. du Pont de Nemours Company) or other desired materials with suitable characteristics. Further, the radiating element 34 may include conductive serpentine traces (not shown in the accompanying figures) provided thereon in a conventional manner, if desired. As known, the serpentine traces may be used to provide the desired inductance, capacitance and distributed capacity of the radiating element. Of course, any desired serpentine trace, including none at all, may be used.

Figure 3:
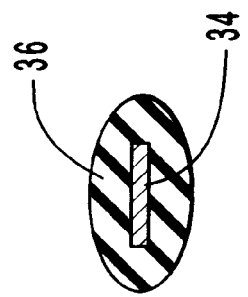
FIG. 3 is a cross-sectional side view along lines 3—3 of the antenna shown in FIG. 2.
Figure 4:
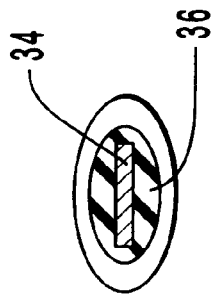
FIG. 4 is a cross-sectional side view along lines 4—4 of the antenna shown in FIG. 2.

The radiating element 34 has a length between about 0.5 inches and about 5.0 inches, and more preferably the radiating element has a length of about 1.2 inches. It will be appreciated that the length of the radiating element 34 and/or groundplane may be adjusted to tune the antenna 32 for resonance so that the electrical interface with the associated transmitter is most efficiently achieved. As best seen in FIGS. 2–4, the radiating element 34 preferably has a generally elliptical configuration with a width between about 0.12 inches and about 0.18 inches, and a thickness in the range between about 0.03 inches and about 0.04 inches proximate the base 28 of the antenna and between about 0.005 inches and about 0.007 inches proximate the free end 40 of the antenna. It will be understood that the dimensions and configuration of the radiating element 34 may vary, for example, depending upon the materials used to construct the antenna 32 and the intended use of the antenna.

The antenna 32 also includes a protective sheath or covering 36 which substantially encloses the radiating element 34, but the sheath may also cover only a portion of the radiating element. The sheath 36 is constructed of a flexible, elastic material which allows the radiating element 34 to bend or deflect into the desired configuration. In particular, the sheath 36 is molded around the radiating element 34 in such a manner that the section modulus is considerably reduced to allow the radiating element to be bent from the generally straight position to the angled position without exceeding the elastic limit of the material. The sheath 36 is preferably constructed of an elastomeric material such as flexible polyvinyl chloride (PVC), Kraton® (a thermoplastic rubber material available from the Shell Oil Company), Santoprene® (a thermoplastic elastomer available from the Monsanto Company) or other materials with suitable characteristics. It will be appreciated that a variety of elastomeric or flexible materials with the desired characteristics may be utilized to construct the sheath 36.

As seen in FIG. 2, the antenna 32 includes a strain relief section 42 which facilitates bending of the antenna. The strain relief section 42 includes a plurality of ridges or generally U-shaped sections 44 in the outer surface of the sheath 36 and these U-shaped sections minimize the effects of bending the antenna 32. The strain relief section 42 is preferably positioned proximate the base 38 of the antenna 32 to allow the antenna to be readily bent or flexed.

In greater detail, the antenna 32 can be bent or curved into any desired position. In particular, the antenna 32 may be placed in a first position 46 wherein the base 38 and free end 40 of the antenna are generally linearly aligned. The antenna 32 may also be placed in a second position 48 wherein the free end 40 is at approximately a 90° angle relative to the base 38. The antenna 32 is preferably constructed such that it is normally in the first position 46 and readily bendable into the second position 48. Alternatively, the antenna 32 may be normally in the second position 48 and readily bendable into the first position 46. The antenna 32 may resiliently return to its original position after a bending force is removed, or the antenna may remain in a bent position until another bending force is applied to the antenna.

Figure 5:
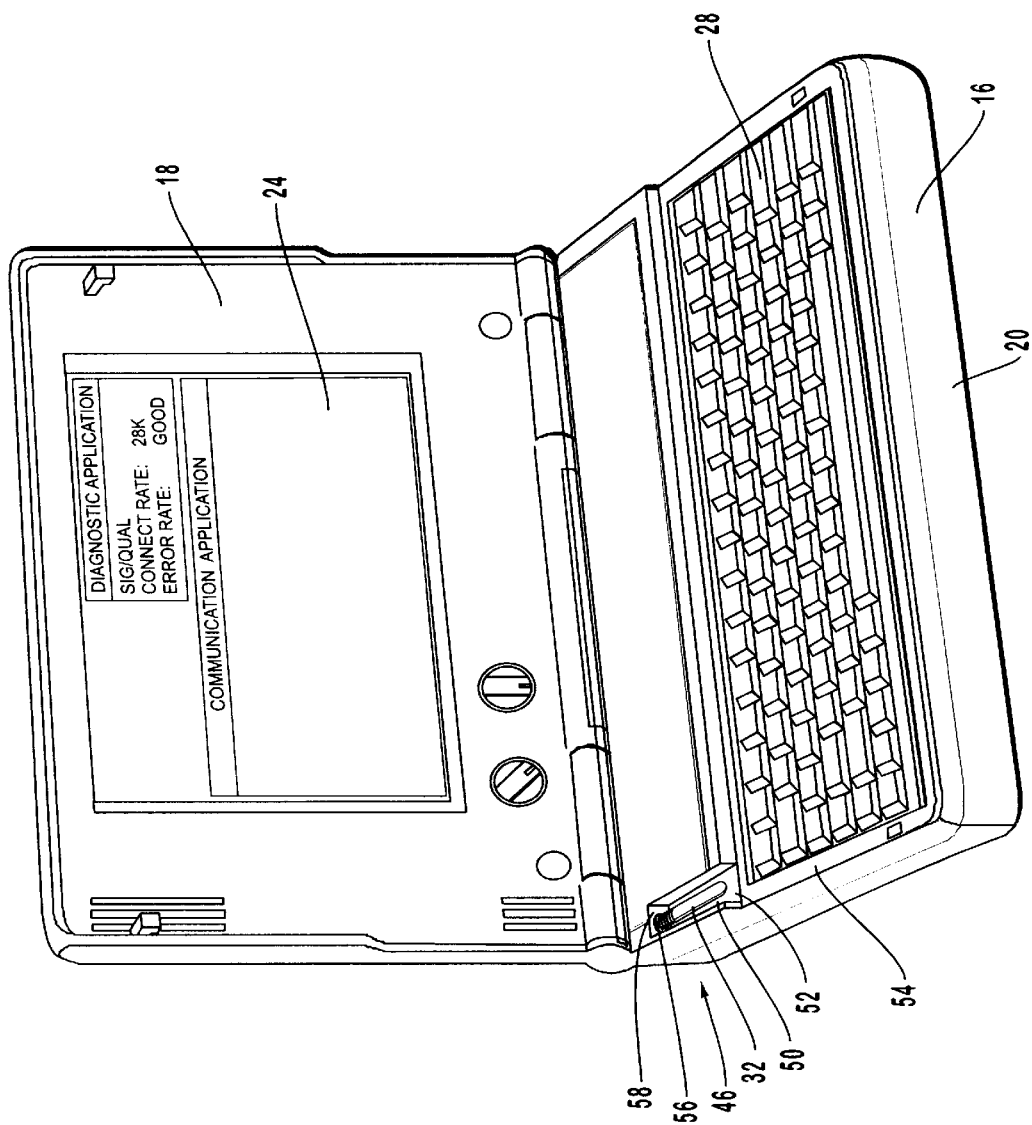
FIG. 5 is a perspective view of the antenna system shown in FIG. 1, illustrating the antenna substantially positioned within the storage compartment.

As best seen in FIGS. 1 and 5, the base 20 of the computer 10 include a recess or storage compartment 50 with an opening 52 in the upper surface 54 of the base. The storage compartment 50 is sized and configured to receive at least a portion of the antenna 32. Preferably, the storage compartment 50 has a length of about 1.5 inches and a depth of about 0.5 inches, but the storage compartment may have any desired dimensions depending, for example, upon the size and configuration of the antenna 32.

As best seen in FIG. 5, the antenna 32 is connected by a fastener 56 to the base 20 of the computer 10. The fastener 56 is attached to a side wall 58 of the recess 50, but the fastener could also be attached to the lower wall 60 of the recess or to the base 20 itself. When the antenna 32 is in the storage position, as seen in FIG. 5, the antenna is positioned within the recess 50. Alternatively, when the antenna 32 is in the use position, as seen in FIG. 1, the antenna extends generally outwardly from the base. As discussed above, the antenna 32 is preferably positioned generally perpendicular to the upper surface 54 of the base 20 when the antenna is positioned within the recess 50.

In greater detail as shown in FIG. 5, the antenna 32 is in the first, generally linear position 46 when it is in the storage position. On the other hand, as shown in FIG. 1, the antenna 32 is in the second, angled position 48 when it is in the use position. It will be understood that the antenna 32 could also be stored in the second, angled position 48 and used in the first, generally linear position.

The fastener 56 is an RF connector that attaches the antenna 32 to the adaptor which provides the interface between the computer 10 and the antenna 12. Additionally, the RF connector is supported by a ground plane (not shown in the accompanying figures). The ground plane is preferably an integral part of the antenna assembly 12, and more preferably, an integral part of the recess 50 in the base 20. Alternatively, the frame or chassis of the keyboard 28 could be the ground plane for the antenna 32. One skilled in the art will understand that the ground plane may include any desired part of the computer housing 16 or it may be a separate component placed internal or external to the computer housing. For example, the ground plane could be attached to the housing 16 of the computer 10 by any suitable means such as snaps, fasteners, latches, etc. These fasteners are preferably integrally attached to the computer housing, but the fasteners may also be releasably attached to the computer housing. The ground plane is preferably constructed of a metallic material such "black" stainless steel, black chrome carbon steel or black anodized aluminum, but any desired material with suitable characteristics may be used.

Alternatively, in order to eliminate the need for the lateral ground plane, the antenna system 12 could include a single monopole antenna with a quarter wavelength radiating section and an opposing quarter wavelength ground plane section. This embodiment, however, requires a taller antenna that the other embodiments which utilize the lateral ground plane.

During use of the portable computer 10, the antenna 32 is preferably in the use position with the antenna extending generally vertically to facilitate wireless communication. In contrast, when use of the computer 10 is not desired and the computer is closed, the antenna 32 is in the storage position. Desirably, the antenna 32 is automatically moved to the use position or storage position depending upon whether the computer is open or closed. Set forth below are several exemplary embodiments of various mechanisms used to position the antenna in the desired position.

As seen in FIG. 6, a cam 60 is connected to a hinge 62 which pivotally connects the display 22 to the base 20. The hinge 62 is connected to the cam 60 by a shaft 64 and opening of the computer 10 causes the cam to rotate. Attached to an edge of the cam 60 is a connecting member 66 that connects the cam 60 to a sliding member 68. The sliding member 68 is located in tracks 70 positioned proximate the opening 52 of the recess 50. The rotation of the cam 60 causes the connecting member 66 and the sliding member 68 to move. In particular, opening the computer 10 causes the sliding member 68 to be retracted from the opening 52 of the recess 50 and closing the computer causes the sliding member to cover the opening to the recess.

In this embodiment, the antenna 32 of the antenna system 12 is normally in the second position 48 such that when the computer 10 is in the open position and the sliding member 68 is retracted, the antenna protrudes through the opening and it is generally positioned perpendicular to the upper surface 56 of the base 20. On the other hand, as seen in FIG. 7, when the computer 10 is closed, the sliding member 68 is pushed over the opening 52 of the recess 50 and that forces the antenna 32 inside the recess. When the computer 10 is opened again, the sliding member 68 is retracted from the opening 52 and the antenna 32 resiliently returns to the second position 48 to facilitate wireless communication.

Alternatively, the antenna 32 may be constructed so that it is normally in the first position 46 and it is attached to the computer 10 such that it protrudes normal to the upper surface 56 of the base 20 when the computer is in the open position. The closing of the computer 10 pushes the sliding member 68 over the opening 52 and that forces the antenna 32 intotherecess 50.

Figure 8:
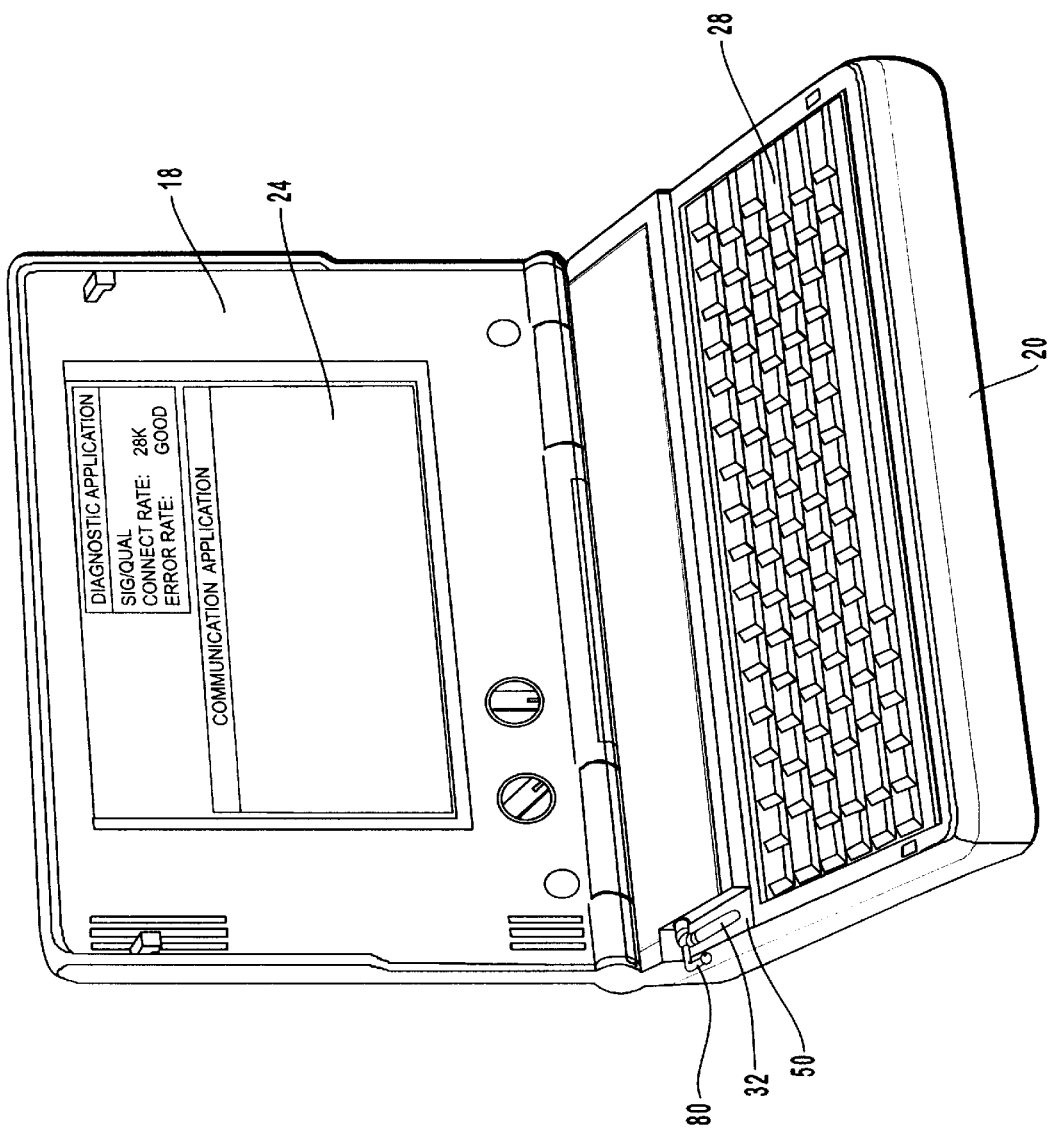
FIG. 8 is a perspective view of an antenna system for a portable computer in accordance with another preferred embodiment of the present invention.

Another embodiment of the antenna system 12 is shown in FIG. 8. In this embodiment, a lever 80 is used to position the antenna 32 within the recess 50 when desired by the user. In particular, the lever 80 is configured to be rotated by the user and the rotation of the lever causes the antenna 32 to move into the recess 50 in the base 20. As shown in the accompanying figures, rotation of the lever 80 in a counter-clockwise direction causes the antenna 32 to be pivoted upwardly and when the lever is rotated in a clockwise direction, the antenna is pivoted into the recess 50. Advantageously, the movement of the antenna 32 by rotation of the lever 80 eliminates contact of the antenna with the housing 16 or other components of the computer 10, and this reduces wear caused by the contact of the antenna 32 with other components.

Figure 9:
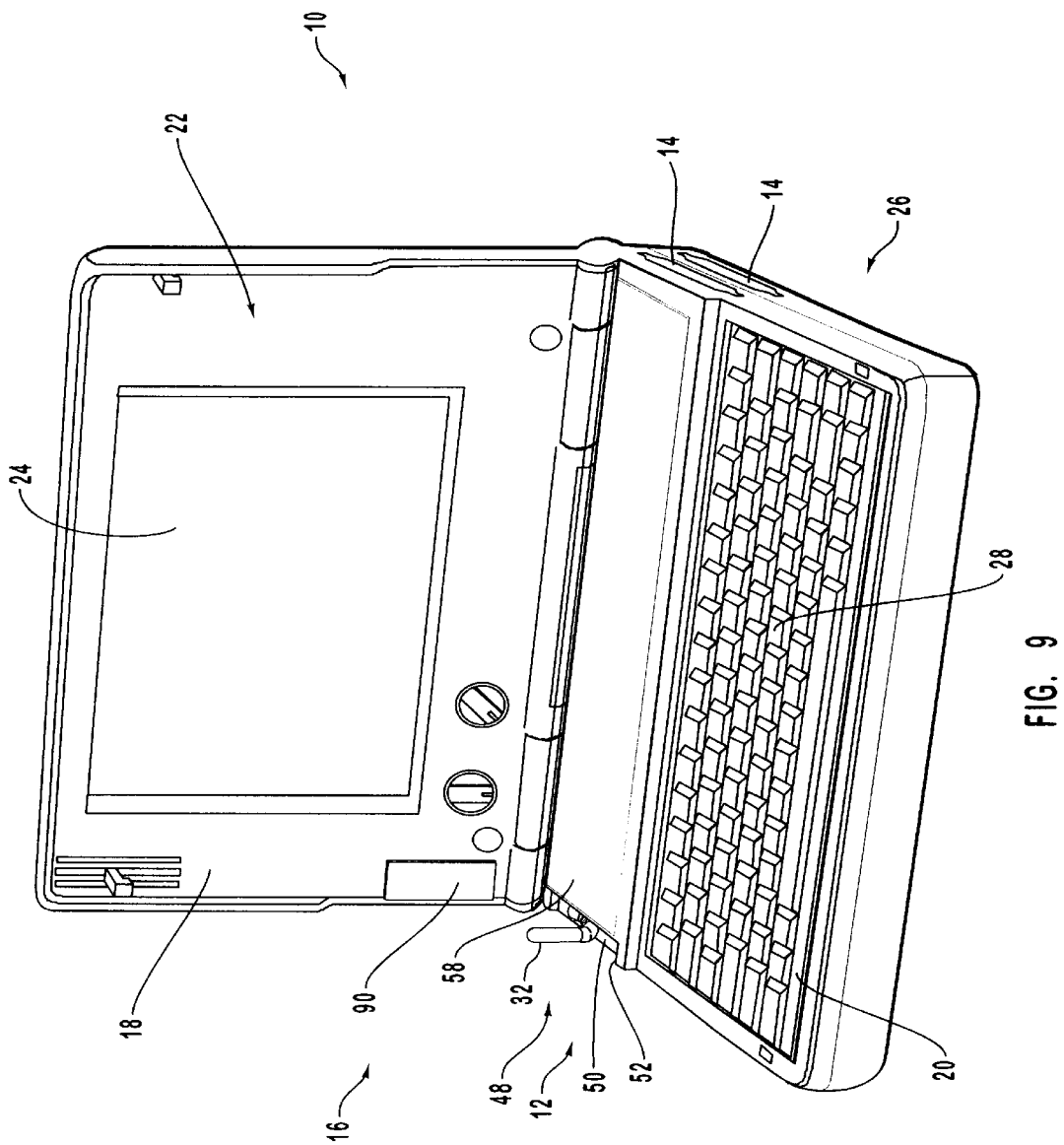
FIG. 9 is a perspective view of an antenna system for a portable computer in accordance with yet another preferred embodiment of the present invention.

Yet another embodiment of the antenna system 12 is shown in FIG. 9. In this embodiment, the base 28 of the antenna 32 is attached to a wall forming the recess 50 in the computer housing 16. The antenna 32 is configured to extend generally perpendicular to the upper surface 54 of the base 20. When the display screen 24 is moved in the closed position, an engagement surface 90 on the display screen engages the free end 40 of the antenna 32 and forces the antenna into the recess 50. When the computer 10 is opened, the antenna 32 resiliently returns to its original generally vertical position.

Figure 10:
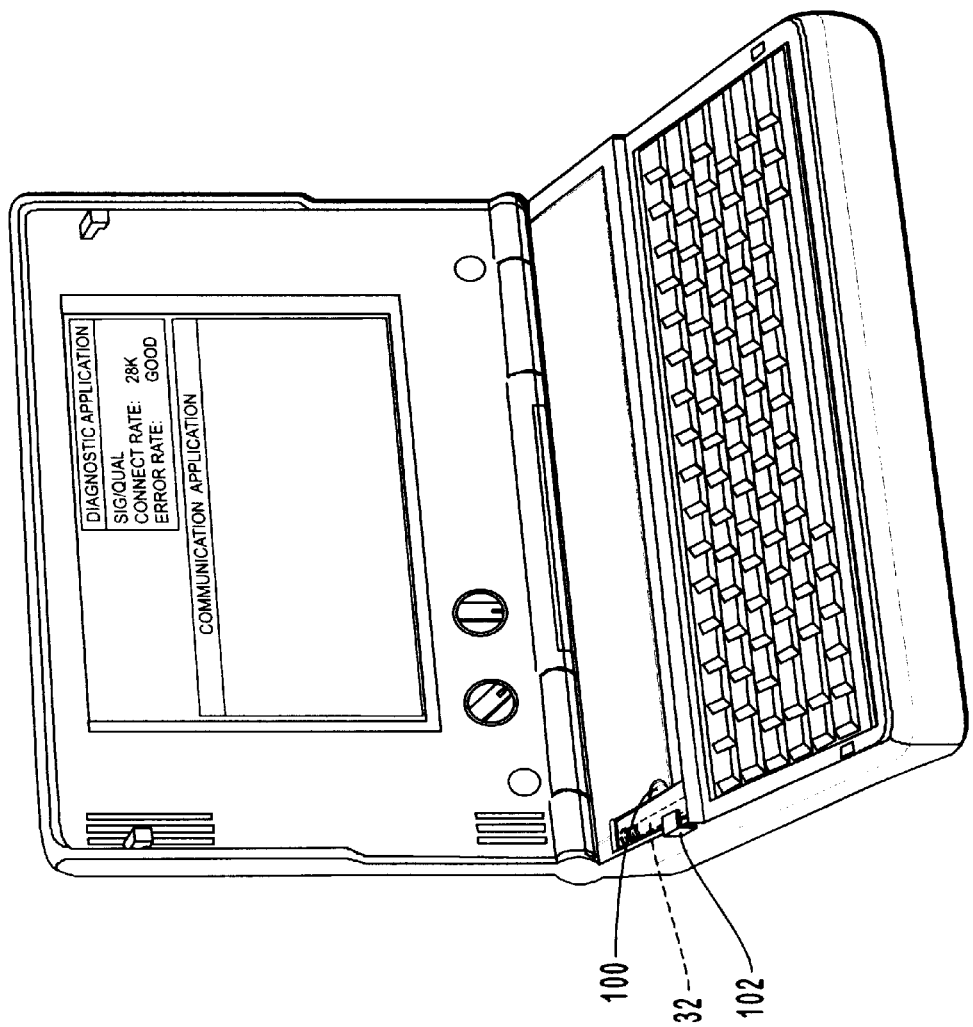
FIG. 10 is a perspective view of an antenna system for a portable computer in accordance with still another preferred embodiment of the present invention.

In yet another embodiment, as shown in FIG. 10, the antenna 32 is manually movable between the use position and the storage position. Thus, when the computer 10 is opened, the antenna 32 stays within the recess 50 until the user desires to remove the antenna. Preferably, the user inserts his or her finger into cut-out section 100 to grasp the antenna 32 and pull it into the desired position. The antenna 32 remains in the desired position until the user manually returns the antenna to the recess 50. Advantageously, this allows the antenna 32 to remain in the storage position even when the computer is in the open position. A latch or catch 102 may also be used to hold the antenna 32 in the desired position.

Figure 11:
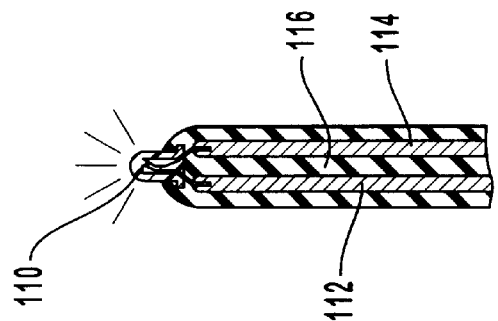
FIG. 11 is a side view of an antenna in accordance with another preferred embodiment of the present invention.

As shown in FIG. 11, another preferred embodiment of the antenna 32 includes an indicator such as a light source 110 attached to the free end 40 of the antenna. The light source 110 may indicate the use of wireless communication system. Preferably, the light source 110 is a light emitting diode (LED), but any suitable light source may be used. The light source 110 is positioned at the free end 40 of the antenna 32 so that it is readily visible to others to indicate that the wireless communication system is in use. For example, airline personnel could quickly and easily determine that the wireless communication system is in use. This may be very useful because the Federal Aviation Administration (FAA) may require all portable computers 10 to have an indicator which denotes the use of the computer 10 or wireless communication system. It will be appreciated, however, that the light source may be positioned in any desired location and other types of indicators, such as sounds, may also be used. The light source 110 may also be used for other purposes such as a signal strength indicator which allows the user to optimize the portioning of the antenna 32.

In detail, the antenna 32 shown in FIG. 11 includes two elongated radiating elements 112 and 114 instead of a single radiating element 34. The first element 112 is a signal or power source for the light source 110 and the second element 114 is a ground source. The two elements 112 and 1 14 are separated by a dialectic material 116, and the elements are positioned proximate to each other to create either a dipole or monopole antenna.

Figure 12:
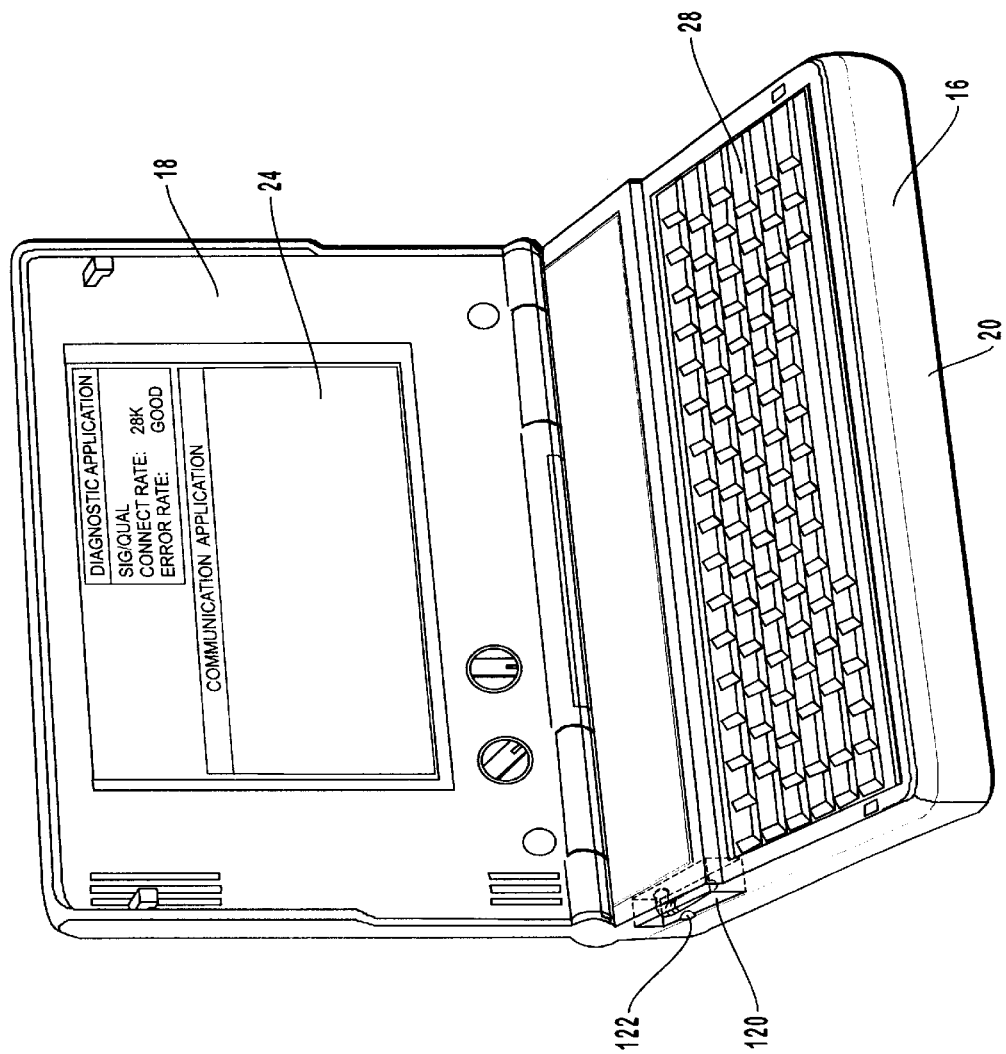
FIG. 12 is a perspective view of an antenna system for a portable computer in accordance with yet another preferred embodiment of the present invention.

In yet another embodiment of the present invention, as shown in FIG. 12, the computer 10 is configured to allow the antenna system 12 to be used and operated while in the closed position. As shown in FIG. 12, the antenna 32 may be pivoted or rotated laterally away from the computer housing 16 such that the antenna extends outwardly from the computer. In greater detail, the computer housing 16 includes an opening 120 with a cut-out section 122 which allows a user to manually grasp the antenna 32 and remove it from the recess 50 in the base 20 of the computer 10. The cut-out section 122 advantageously aids the user in removing the antenna 32 from recess 50. Thus, the antenna 32 is positioned to transmit and receive information while the computer 10 is in the closed position. Advantageously, this allows the antenna system 12 to be in contact with a wireless communication system even while the computer is in the closed position. For example, this allows the computer 10 to link to another computer for purpose such as updating or backing up the files on the portable computer. In addition, this may allow the computer 10 to be docked or coupled to a docking station while the computer is in the closed position.

Although this invention has been described in terms of certain preferred embodiments, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for establishing wireless communication between a portable computer and a communications network, said apparatus comprising:

a portable computer including a cover and a base unit, said base unit including an upper surface, a lower surface and side walls, said portable computer including an open position and a closed position;

an antenna including a first end and a second end, said first end being attached to said base unit of said portable computer in a generally fixed location relative to said upper surface of the base unit; and a storage compartment in said base unit, said storage compartment being sized and configured to receive at least a portion of said antenna when said computer is in said closed position.

2. The apparatus of claim 1, wherein said antenna is attached proximate said upper surface of said base unit.

3. The apparatus of claim 1, further comprising an input device connected to said base unit and wherein said antenna is attached to said base unit proximate said input device.

4. The apparatus of claim 1, wherein said antenna automatically extends outwardly from said base unit to facilitate wireless communication between said computer and the communications network when said computer is in said open position.

5. The apparatus of claim 4, wherein said antenna extends generally perpendicular to said upper surface of said base unit.

6. The apparatus of claim 1, wherein said antenna is automatically positioned within said storage compartment when said computer is in said closed position.

7. The apparatus of claim 1, wherein said antenna is positioned generally parallel to the upper surface of said base unit when said antenna is stored in said storage compartment; and wherein said antenna is positioned generally perpendicular to the upper surface of said base unit when said antenna is configured for wireless communication between the portable computer and the communications network.

8. The apparatus of claim 1, wherein said antenna is configured to be positioned in a use position when said computer is in said open position and said antenna is configured to be positioned in a storage position when said computer is in said closed position.

9. The antenna of claim 8, wherein said antenna is generally linearly aligned when said antenna is in said storage position and said antenna is in an angled position when said antenna is in said use position.

10. The apparatus of claim 1, further comprising a sliding member which is slidably movable to cover an opening of said storage compartment.

11. The apparatus of claim 10, further comprising a cam that is connected to said sliding member, wherein said cam is rotated by the opening and closing of said computer.

12. The apparatus of claim 1, further comprising a surface on said cover that engages said antenna when said computer is being closed to position said antenna in said storage compartment.

13. The apparatus of claim 1, further comprising a latch mechanism which releasably retains said antenna in said storage compartment.

14. The apparatus of claim 1, further comprising an opening in said storage compartment to allow said antenna to be removed from said storage compartment without said computer being in said open position.

15. The apparatus of claim 1, further comprising a flexible sheath covering said antenna.

16. The apparatus of claim 15, wherein said flexible sheath includes a strain relief section.

17. The apparatus of claim 1, further comprising an indicator attached to said antenna to indicate use of the apparatus.

18. A portable computer having an open position and a closed position, said portable computer comprising:
- a base unit including an upper surface, a lower surface and at least two side walls;
- an antenna connected to said base unit, said antenna configured to allow wireless communication between the portable computer and a wireless communication system; and
- a recess sized and configured to receive at least a portion of said antenna when said computer is in the closed position, at least a portion of said antenna being automatically stored in said recess when the computer is in the closed position, at least a portion of said antenna being automatically deployed from said base unit when the computer is in the open position.

19. A flexible antenna for use with a portable computer, the flexible antenna including a first end and a second end, the portable computer including a base unit with a recess being sized and configured to receive the first end of the antenna in a generally fixed location relative to the base unit, said antenna comprising:
- a flexible, radiating element;
- a flexible sheath covering said elongated radiating element, said sheath configured to permit said radiating element to bend; and
- a strain relief section in said flexible sheath to facilitate bending of said antenna;
- wherein the antenna is configured to be positioned within the recess in the base unit of the portable computer when the antenna is in a stored position and wherein the antenna is configured to extend outwardly from the base unit when the antenna is in a use position.

20. The antenna of claim 19, further comprising an indicator attached to said radiating element.

21. The antenna of claim 20, wherein said indicator is a light source that indicates use of the antenna or portable computer.

22. The antenna of claim 19, wherein said radiating element comprises a plurality of elongated members positioned proximate to each other.

23. The antenna of claim 22, wherein said elongated members are separated by a dielectric material.

24. The antenna of claim 22, wherein one of said elongated members provides a signal source to an indicator and another of said elongated members provides a ground source for said indicator.

25. The antenna of claim 19, wherein said radiating element comprises two members separated by a dielectric material.

26. The antenna of claim 25, wherein said two members operatively form a single radiating component.

27. The antenna of claim 25, wherein said two members are spaced and configured to act as a single monopole antenna.

28. The antenna of claim 25, wherein one of said two members provides a signal source to an indicator and the other of said two members provides a ground source for said indicator.

29. The antenna of claim 19, further comprising a fastener connected to a first end of the elongated radiating element and configured to attach the antenna to a portable computer.

30. The antenna of claim 19, wherein said antenna is configured for use with a Bluetooth wireless communication system.

31. An electronic device including an open position and a closed position, the electronic device comprising:
- a first portion;
- a second portion movably connected to said first portion, said first portion and said second portion movable between the open position and the closed position;
- a flexible antenna attached to said first portion, said flexible antenna having a first end and a second end, said flexible antenna having a first position wherein said first end and said second end are substantially linearly aligned and a second position wherein said first end and said second end are positioned at an angle, the flexible antenna being automatically positioned in the first position when the electronic device is in a first position, the flexible antenna being automatically positioned in the second position when the electronic device is in a second position.

32. The electronic device of claim 31, further comprising an opening in said first portion, said flexible antenna being stored in said opening in said first position.

33. The electronic device of claim 31, wherein said second end of said flexible antenna is positioned generally perpendicular to an upper surface of the first portion in said second position.

34. The electronic device of claim 31, wherein said flexible antenna is positioned at approximately a 90° angle in said second position.

* * * * *

UNITED STATES PATENT AND TRADEMARK OFFICE
CERTIFICATE OF CORRECTION

PATENT NO.    : 6,181,284 B1
DATED         : January 30, 2001
INVENTOR(S)   : Brent D. Madsen, Jeffery L. Jones, Dirk Ostermiller, Sy Prestwitch and Ryan Kunz It is certified that error appears in the above-identified patent and that said Letters Patent is hereby corrected as shown below:

Column 5,
Line 25, before "small" insert -- a --

Column 9,
Line 52, before "50" change "comportment" to -- compartment --

Colum 10,
Line 38, before "the other" change "that" to -- than --

Column 11,
Line 15, after "32" change "intotherecess" to -- into the recess --
Line 58, after "use of" insert -- the --
Line 67, after "computers" delete "10"

Column 12,
Line 1, after "computer" delete "10"
Line 34, after "for" change "purpose" to -- purposes --

Column 14,
Line 59, after "position;" insert -- and --

Signed and Sealed this

Twenty-third Day of July, 2002

Attest:

JAMES E. ROGAN
Attesting Officer    Director of the United States Patent and Trademark Office